(12) United States Patent
Weaver

(10) Patent No.: US 9,043,852 B2
(45) Date of Patent: *May 26, 2015

(54) METHODS, DEVICES, AND COMPUTER PROGRAM PRODUCTS FOR PROVIDING INSTANT MESSAGING IN CONJUNCTION WITH AN AUDIOVISUAL, VIDEO, OR AUDIO PROGRAM

(71) Applicant: AT&T Intellectual Property I, L.P., Atlanta, GA (US)

(72) Inventor: Tim Weaver, Alpharetta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 177 days.

This patent is subject to a terminal disclaimer.

(21) Appl. No.: 13/764,046

(22) Filed: Feb. 11, 2013

(65) Prior Publication Data
US 2013/0152146 A1 Jun. 13, 2013

Related U.S. Application Data

(63) Continuation of application No. 12/164,213, filed on Jun. 30, 2008, now Pat. No. 8,407,751.

(51) Int. Cl.
| | |
|---|---|
| *H04N 7/173* | (2011.01) |
| *H04N 7/16* | (2011.01) |
| *G06F 3/00* | (2006.01) |
| *H04N 21/643* | (2011.01) |
| *H04N 21/231* | (2011.01) |
| *H04N 21/258* | (2011.01) |
| *H04N 21/478* | (2011.01) |
| *H04N 21/8352* | (2011.01) |

(52) U.S. Cl.
CPC ..... *H04N 21/64322* (2013.01); *H04N 7/17318* (2013.01); *H04N 21/23109* (2013.01); *H04N 21/25883* (2013.01); *H04N 21/478* (2013.01); *H04N 21/8352* (2013.01)

(58) Field of Classification Search
CPC .................................................. H04N 21/4788
See application file for complete search history.

(56) References Cited

U.S. PATENT DOCUMENTS

| 6,879,994 | B1 * | 4/2005 | Matsliach et al. ............ 709/204 |
| 2005/0108767 | A1 * | 5/2005 | Ma ................................ 725/105 |
| 2005/0262542 | A1 * | 11/2005 | DeWeese et al. ............. 725/106 |
| 2009/0164516 | A1 * | 6/2009 | Svendsen et al. .......... 707/104.1 |

* cited by examiner

*Primary Examiner* — Gigi L Dubasky
(74) *Attorney, Agent, or Firm* — Cantor Colburn LLP

(57) ABSTRACT

Methods, devices, and computer program products for providing instant messaging in conjunction with an audiovisual, video, or audio program are provided. The methods include providing an audiovisual, video, or audio program to a user. Viewer/listener input is received requesting activation of a program-based instant messaging function. A viewer/listener identifier corresponding to the viewer/listener is associated with a program identifier that uniquely identifies the audiovisual, video, or audio program being provided to the user to thereby generate a program viewer/listener record. The program viewer/listener record is transmitted to an electronic database. A list of other users who are viewing or listening to the program in addition to the viewer/listener is acquired from the electronic database. The list of other users is transmitted to the viewer/listener.

20 Claims, 5 Drawing Sheets

METHODS, DEVICES, AND COMPUTER PROGRAM PRODUCTS FOR PROVIDING INSTANT MESSAGING IN CONJUNCTION WITH AN AUDIOVISUAL, VIDEO, OR AUDIO PROGRAM

CROSS-REFERENCE TO RELATED APPLICATIONS

This application is a continuation of U.S. Non-Provisional application Ser. No. 12/164,213, entitled "METHODS, DEVICES, AND COMPUTER PROGRAM PRODUCTS FOR PROVIDING INSTANT MESSAGING IN CONJUNCTION WITH AN AUDIOVISUAL, VIDEO, OR AUDIO PROGRAM", filed Jun. 30, 2008, which is incorporated herein by reference in its entirety.

BACKGROUND OF THE INVENTION

The present invention relates generally to delivery of media content in connection with a wide area data network and, more particularly, to methods, devices, and computer program products for providing instant messaging in conjunction with an audiovisual, video, or audio program.

Delivering media content over a wide area data network is an increasingly popular method of transmitting digital video to viewers, enabling network providers to offer video services much more efficiently than in the case of traditional cable television systems. Internet Protocol Television (IPTV) represents one illustrative approach for delivering media content over a network. In contrast to broadcast television, IPTV has no inherent limitation on the total number of channels that can be offered for transmission. As a practical matter, the number of channels that can be carried to IPTV subscribers is significantly higher relative to traditional video delivery systems, limited only by the overall capacity of the network and the portion of the network, which is allocated to IPTV services. Moreover, the same data transmission capacity of a network can be used for IPTV as well as other types of data traffic.

Instant messaging, often shortened to "IM" or "IMing," involves the exchange of text messages through a software application in real time. These software applications, operating in conjunction with one or more specific Internet browsers and Internet Service Providers (ISPs), enable users to identify whether or not a chosen friend, co-worker or "buddy" is online and connected to the selected ISP. In the past, both the message sender and message recipient were required to use the same software in order for the IM feature to work. However, some current software may provide interoperability between different networks and ISPs, such as Microsoft's recently developed Live Messenger. Also, recent developments in mobile cellular phone technology now allow handset users to always be available via IM, through such popular devices as the T-Mobile Sidekick II or other smart phones.

IMing differs from ordinary e-mail in that IMing provides a more immediate exchange of messages and also renders a continued exchange of messages much simpler than sending e-mail back and forth. Under most conditions, IMing is truly "instant." Even during peak Internet usage periods, the delay is rarely more than a second or two. It is possible for two or more people to have a real-time online conversation by IMing each other back and forth.

Most IM exchanges are text only, though popular ISPs such as AOL, MSN Messenger, Yahoo! Messenger and Apple's iChat, now allow voice messaging, file sharing and even video chat when both users have cameras. In order for IMing to work, both users (sender and recipient) must be connected to the Internet at the same time. Also, the intended recipient must be willing to accept instant messages, as it is possible for the recipient to configure their IM software to deliberately disable the IM feature so as to avoid being disturbed. An attempt to send an IM to someone who is not online, or who is not willing to accept IMs, will result in notification that the transmission cannot be completed. If the IM software is set to accept IMs, the presence of an incoming IM is indicated by means of an alert such as a distinctive sound, a pop-up window indicating that an IM has arrived and allowing the recipient to accept or reject it, or a window containing the incoming message itself.

Not infrequently, an individual watching a television program or listening to an audio program wishes to exchange their opinions of the program with other viewers or listeners. At present, this functionality may be accomplished by means of the viewers or listeners logging onto the Internet and sending instant messaging back and forth. However, using this approach, a program viewer or listener is uncertain as to whether or not any of their IM "buddies" are, in fact, viewing or listening to the program. What is needed is an improved instant messaging technique, which enables program viewers and listeners to identify other individuals that are watching or listening to the program. Exemplary embodiments of the instant messaging technique enable instant messages to be sent back and forth between these viewers and listeners so as to permit concurrent IMing and program viewing or listening.

BRIEF SUMMARY OF THE INVENTION

Exemplary embodiments include methods for providing instant messaging in conjunction with an audiovisual, video, or audio program. The methods include providing an audiovisual, video, or audio program to a user. A request is received from the user to exchange messages with other users viewing or listening to the audiovisual, video or audio program. A viewer/listener identifier corresponding to the requesting user is associated with a program identifier that uniquely identifies the audiovisual, video, or audio program being provided to the user to thereby generate a program viewer/listener record. The program viewer/listener record is transmitted to an electronic database. A list of other users who are viewing or listening to the program in addition to the requesting user is acquired from the electronic database. The list of other users is transmitted to the requesting user.

Additional exemplary embodiments include devices for providing instant messaging in conjunction with an audiovisual, video, or audio program being displayed or played to a user. The device includes an input mechanism for receiving viewer/listener input from the user requesting activation of a program-based instant messaging function. A processing mechanism, operatively coupled to the input mechanism, associates a viewer/listener identifier corresponding to the user with a program identifier that uniquely identifies the audiovisual, video, or audio program being provided to the user requesting activation to thereby generate a program viewer/listener record. A data transceiver, operatively coupled to the processing mechanism, transmits the program viewer/listener record to an electronic database. The data transceiver receives a list from the electronic database of one or more other users who are viewing or listening to the program in addition to the user requesting activation. The data transceiver transmits the list of one or more other users to the user requesting activation.

Further exemplary embodiments include computer program products for presenting an offer to provide instant messaging in conjunction with an audiovisual, video, or audio program. The computer program products comprise instructions for providing an audiovisual, video, or audio program to a viewer/listener. Viewer/listener input is received requesting activation of a program-based instant messaging function. A viewer/listener identifier corresponding to the viewer/listener is associated with a program identifier that uniquely identifies the audiovisual, video, or audio program being provided to the viewer/listener to thereby generate a program viewer/listener record. The program viewer/listener record is transmitted to an electronic database. A list of other users who are viewing or listening to the program in addition to the viewer/listener is acquired from the electronic database. The list of other users is transmitted to the viewer/listener.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Figure 1:
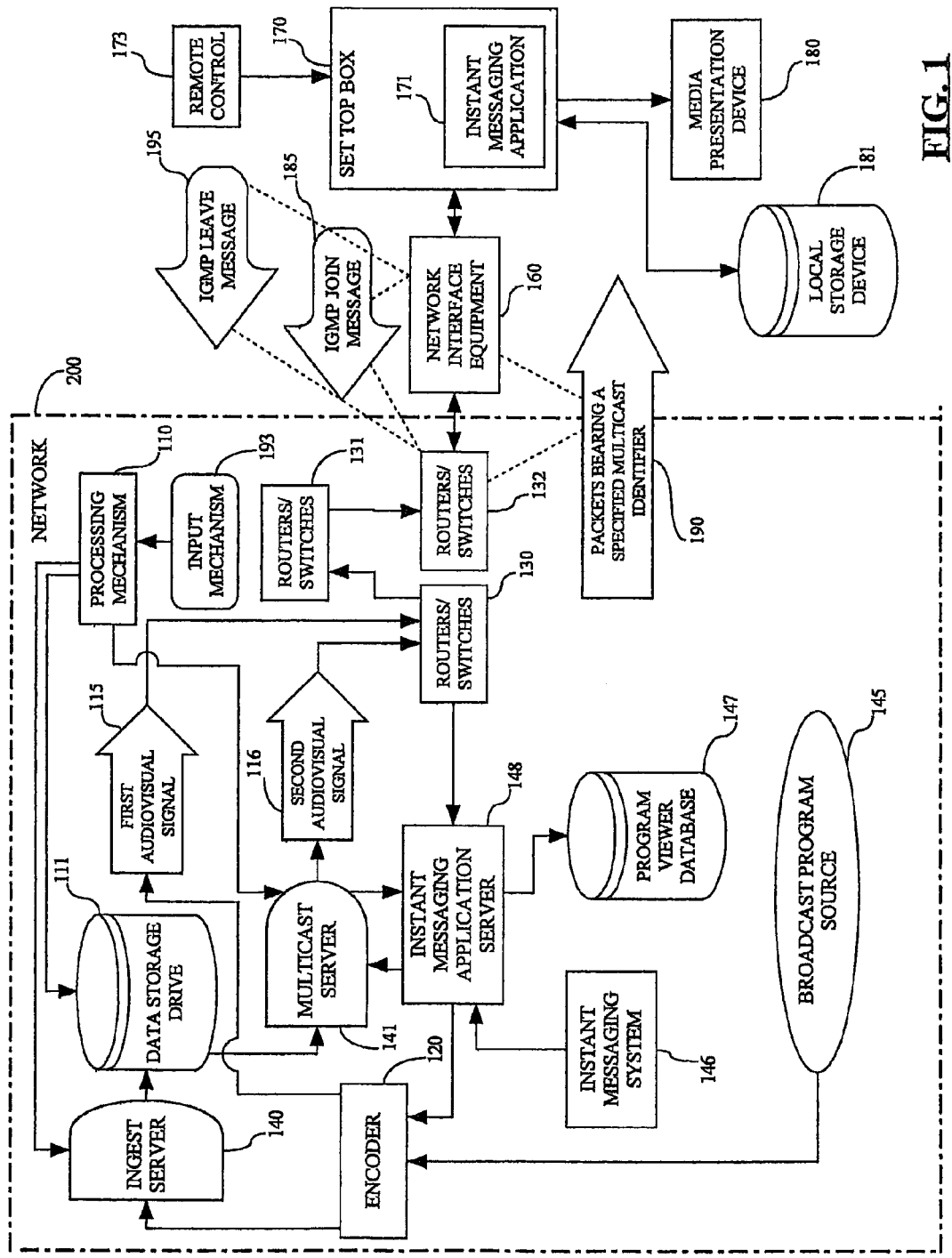
FIG. 1 is a block diagram of an exemplary system that may be utilized to provide instant messaging in conjunction with an audiovisual, video, or audio program.

FIG. 1 is a block diagram of an exemplary system that may be utilized to provide instant messaging in conjunction with an audiovisual, video, or audio program. A wide area data network 200 includes a broadcast program source 145 operatively coupled to an encoder 120. Broadcast program source 145 may be implemented using a satellite receiver, cable television head end, terrestrial broadcast receiver, fiber optic links to one or more television broadcast stations, or various combinations thereof. According to exemplary embodiments, encoder 120 processes each of one or more respective television signals acquired by broadcast program source 145 to generate a corresponding sequence of packets. The sequence of packets is in a digital format compatible with internet protocol (IP) networking.

Optionally, the sequence of packets generated by encoder 120 may be compressed or processed to eliminate redundant information, thereby reducing the bandwidth occupied by one or more of the program streams. For example, IPTV digital video transmission methods currently employ standards developed by the Motion Pictures Expert Group (MPEG) for program stream formatting and network transport. These standards, known collectively as MPEG, define approaches for compressing video content to significantly reduce the bandwidth required for network transport. MPEG compression creates a stream of individual packets or frames, each carrying video content. Illustratively, the sequence of packets generated by encoder 120 is in a packetized format that complies with MPEG-4 standard H.264.

Encoder 120 generates a first multicast program stream including a television program commencing at a scheduled broadcast time. This first multicast program stream is shown as a first audiovisual signal 115. An ingest server 140, illustratively implemented using one or more computer servers, is operatively coupled to encoder 120. Ingest server 140 receives the first multicast program stream and processes the stream for storage on a computer-readable television program storage device such as data storage drive 111. Data storage drive 111, operatively coupled to ingest server 140, electronically stores a television program for one or more subsequent rebroadcasts. Data storage drive 111 is illustratively implemented using one or more computer hard drives, optical storage drives, magnetic tape drives, semiconductor memory, nanotechnology-based memory devices, or various combinations thereof. By way of example, a plurality of separate storage drives may be interconnected or networked to implement data storage drive 111.

Data storage drive 111 is operatively coupled to one or more multicast servers such as a multicast server 141. Multicast server 141 is illustratively implemented using a computer server or a plurality of computer servers. Optionally, a processing mechanism 110 can instruct multicast server 141 to retrieve and multicast a set of audiovisual, video, or audio programming elements in series using a "playlist" which identifies the video programming elements to be included in pre-program material as described in greater detail hereinafter.

The processing mechanism 110 is operatively coupled to data storage drive 111, ingest server 140, and at least one multicast server. In the present example, multicast server 141 is shown. Processing mechanism 110 is illustratively implemented using one or more personal computers, mainframe computers, servers, microprocessor-based devices, or various combinations thereof. Separate elements may be used to implement processing mechanism 110, ingest server 140, and data storage drive 111, or one or more of processing mechanism 110, data storage drive 111, and ingest server 140 could be combined into a single element.

According to exemplary embodiments, processing mechanism 110 is capable of accepting input from an input mechanism 193. Input mechanism 193 could, but need not, be implemented using a computer keyboard, touch screen, pushbuttons, one or more switches, voice-activated software, personal computer, computer server, mainframe computer, laptop computer, computer console, or various combinations thereof. In response to input received at input mechanism 193, processing mechanism 110 may command multicast server 141 to access a stored audiovisual, video or audio program on data storage drive 111 to generate a second multicast program stream including the program commencing at a first delayed time later than the scheduled broadcast time. This second multicast program stream is shown as second audiovisual signal 116.

First and second audiovisual signals 115, 116, each representing streams of individual packets corresponding to respective first and second multicast program streams, pass through a series of routers/switches 130, 131, 132 until one or more of the streams reaches a viewer's location. First and second audiovisual signals 115, 116, are described only for purposes of illustration, it being understood that four signals are not required, as any number of two or more audiovisual signals may be provided.

At the viewer's location, network interface equipment 160 receives one of the first and second multicast program streams from router/switch 132 on network 200. Network interface equipment 160 may be operatively coupled to a set top box 170 using a wireless or wireline link, and illustratively using an Ethernet link. Set top box 170 is operatively coupled to a media presentation device 180, such as a television set, video receiver, audio receiver, or the like, using a wireless or wireline link, and illustratively using coaxial cable carrying an RF-modulated signal. Alternatively or additionally, set top box 170 is coupled to media presentation device 180 using a video connection such as S-Video or FireWire.

According to exemplary embodiments, set top box 170 is equipped with a processing mechanism, such as a microprocessor or microcontroller and associated semiconductor memory, for executing an instant messaging application 171. When a user logs on to instant messaging application 171, the application renders media presentation device 180 capable of implementing an exchange of text messages with another instant messaging user substantially in real time. At this time, instant messaging application 171 may send a viewer/listener identifier and a program identifier to instant messaging application server 148. The viewer/listener identifier corresponds to the viewer or listener at media presentation device 180, and the program identifier identifies the program being provided to the media presentation device. Instant messaging application 171 enables a user to identify one or more other viewers/listeners (for example, a chosen friend, co-worker or "buddy") that are also watching or viewing the identified program while logged onto their respective instant messaging applications. Illustratively, this functionality is performed by instant messaging application 171 initiating display of a list of these other viewers/listeners on media presentation device 180. The user may select a viewer/listener from the displayed list of other viewers and subsequently enter text messages using a remote control 173, an input mechanism on set top box 170, a touch-sensitive screen on media presentation device 180, various combinations thereof, or another user interface.

Via encoder 120, or via network interface equipment 160 and one or more routers/switches 130, 132, instant messaging application 171 interacts with the instant messaging application server 148 on network 200. Based upon information received from instant messaging application 171, instant messaging application server 148 associates each of a plurality of program viewer/listener identifiers with a program identifier that uniquely identifies the audiovisual, video, or audio program being provided to the media presentation device 180 to thereby generate a program viewer/listener record that is stored in a program viewer database 147. Based upon these stored program viewer/listener records, instant messaging application server 148 generates a list of all viewers/listeners that are watching/listening to an identified program while logged onto their instant messaging application, according to exemplary embodiments. Instant messaging application server 148 may send this list to instant messaging application 171. Instant messaging application server 148 is operated by an instant messaging system 146 which is optionally capable of sending instant messages to other IM systems and optionally capable of receiving instant messages from other IM systems.

Set top box 170 includes a channel/program selection mechanism capable of accepting a viewer input identifying one or more channels or programs. This channel/program selection mechanism could, but need not, operate in conjunction with remote control 173 or a touch-sensitive screen on media presentation device 180 to select a displayed program or channel. Alternatively or additionally, set top box 170 may include a channel/program selection mechanism such as a rotary switch and/or a channel/program selection mechanism operated using remote control 173. Set top box 170 may, but need not, include circuitry for converting digital packets representing program streams received from network interface equipment 160 into analog or digital signals capable of being displayed on media presentation device 180.

A viewer may record a program for later viewing using a local storage device 181 such as a digital video disc (DVD) recorder, videocassette recorder (VCR), or hard drive recording device. Optional local storage device may, but need not, be integrated into set top box 170. Moreover, set top box 170 may, but need not, be integrated into media presentation device 180.

Network interface equipment 160 receives a stream of internet protocol (IP) multicast or unicast packets representing an IPTV program stream. Unicast refers to communication between a single sender and a single receiver, whereas multicast refers to communication between a single sender and multiple receivers. To avoid sending a multiplicity of different IPTV program streams simultaneously over network 200, each respective IPTV program stream uses a corresponding IP multicast identifier specific to that IPTV program stream. Using Internet Group Management Protocol (IGMP), network interface equipment 160 communicates with network 200 to identify which program the user desires to view or is currently viewing. More specifically, when a user enters an input into the channel/program selection mechanism on set top box 170, illustratively using remote control 173, set top box 170 transmits an IGMP join message 185 to the network 200.

IGMP join message 185 includes a channel/program identifier that identifies a channel or program that the viewer desires to view or is currently viewing. IGMP join message 185 is sent in an "upstream" direction through routers/switches 132, 131, 130 in an attempt to locate an IPTV program stream on network 200 corresponding to the channel/program identifier. When the appropriate IPTV program stream is located, packets bearing a specified multicast identifier 190 for this stream are transmitted in a "downstream" direction from network 200 to network interface equipment 160 and set top box 170. Set top box 170 then relays the IPTV program stream to media presentation device 180, such as an IPTV program stream representing first audiovisual signal 115 and carrying a first television program at a scheduled broadcast time. Thereafter, when the user enters an input into the channel/program selection mechanism on set top box 170 indicating that he or she wishes to view a second television channel or program, set top box 170 transmits an IGMP leave message 195 to network 200 identifying the first television program, and transmits an IGMP join message 185 to the network 200 identifying the second television channel or program.

As understood by one of ordinary skill in the relevant art, if a program is intended for one and only one subscriber, multicasting is replaced by unicasting. Both multicasting and unicasting fall within the scope of the instant teaching. An example of a unicast program would be a video-on-demand (VOD) program, which by definition is intended for one and only one user destination.

Figure 2A:
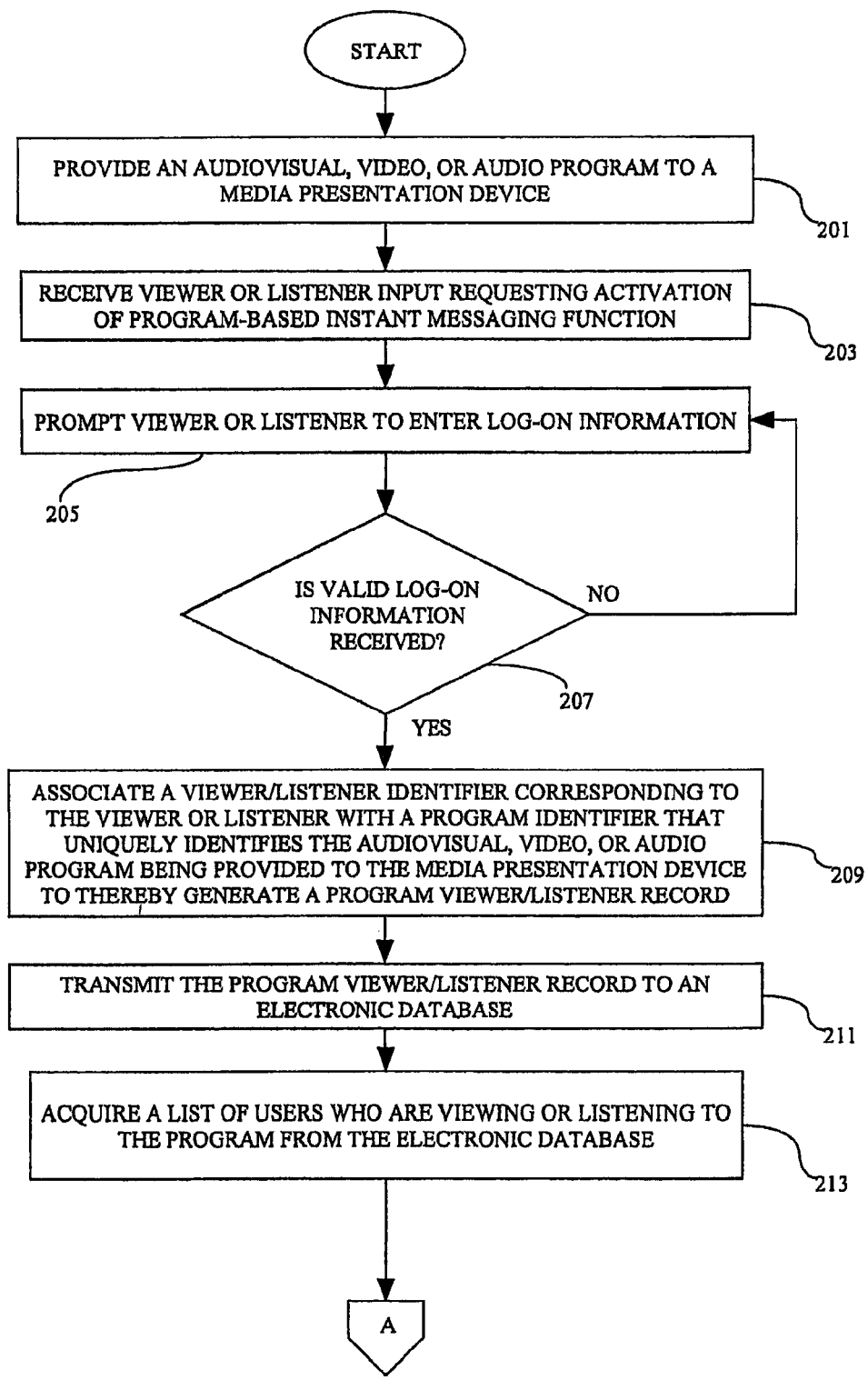
FIGS. 2A-2C together comprise a flow diagram of an exemplary process for providing instant messaging in conjunction with an audiovisual, video, or audio program.
Figure 2B:
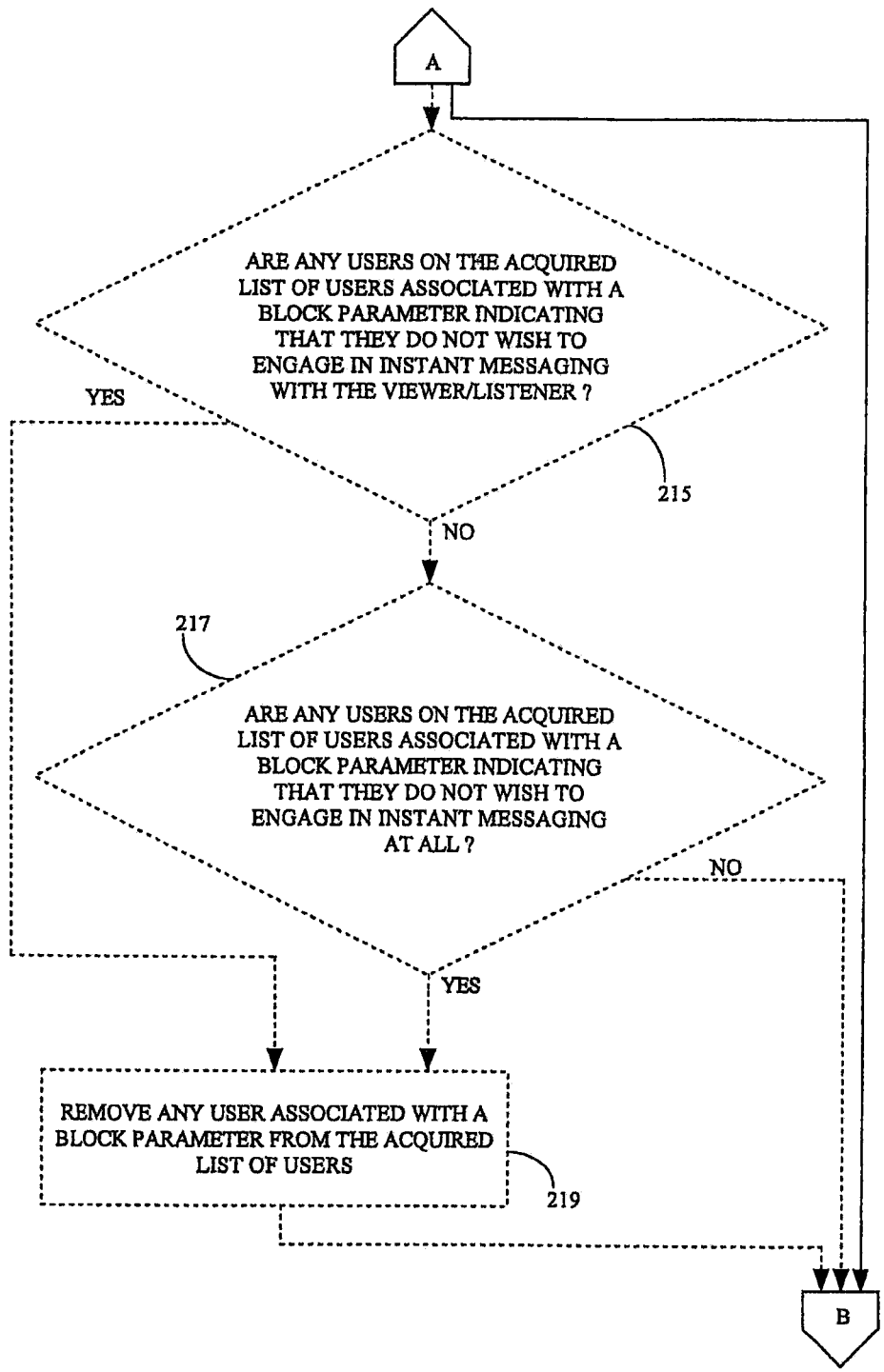
Figure 2C:
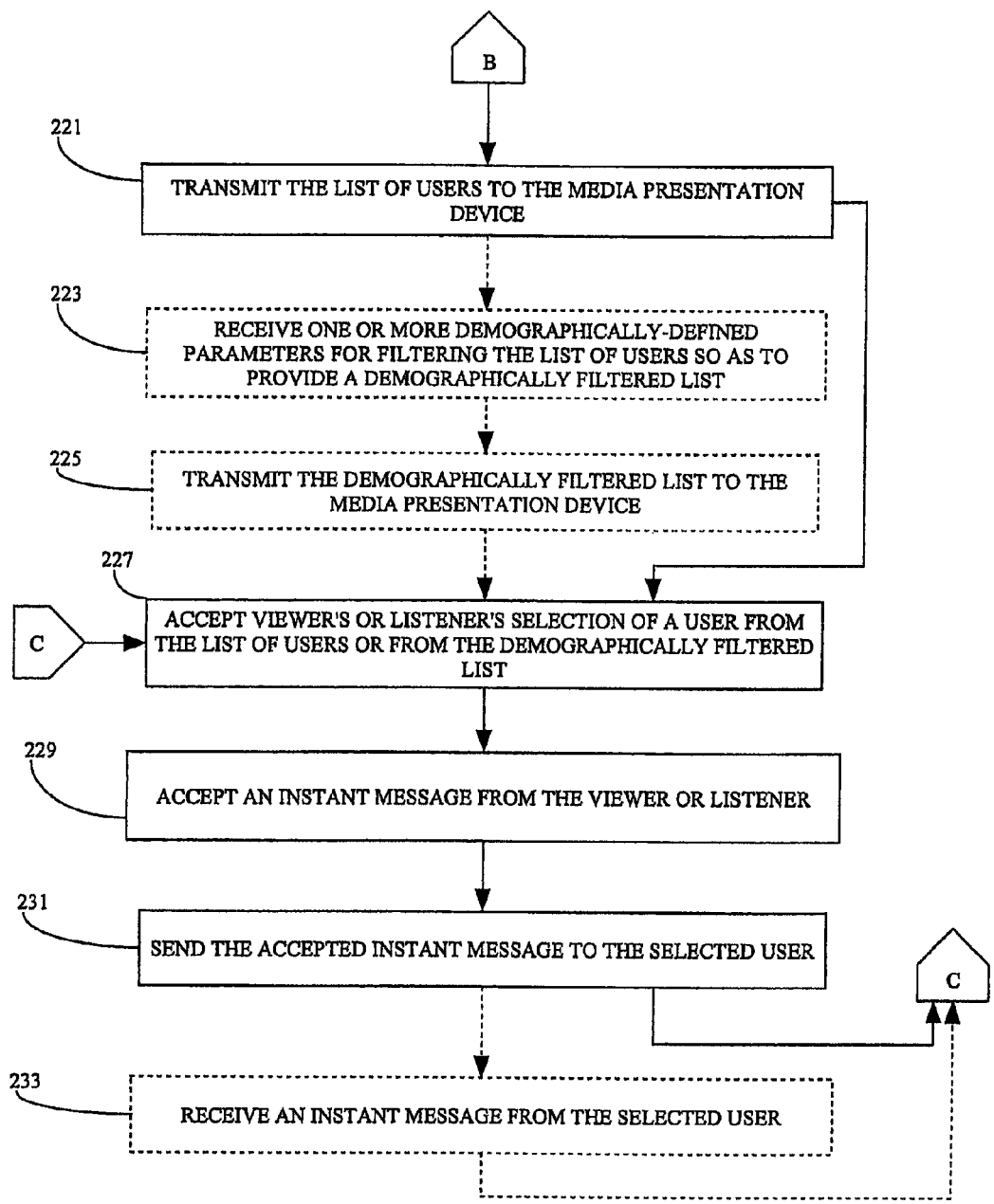

FIGS. 2A-2C together comprise a flow diagram of an exemplary process for providing instant messaging in conjunction with an audiovisual, video, or audio program. The program starts at block 201 (FIG. 2A) where an audiovisual, video, or audio program is provided to media presentation device 180 (FIG. 1). At block 203 (FIG. 2A), viewer or listener input is received requesting activation of a program-based instant messaging function (such as instant messaging application 171, FIG. 1). The instant messaging application 171, issues a prompt to the viewer/listener to enter log-on information (block 205, FIG. 2A). The viewer/listener may enter log-on information, for example, using remote control 173 (FIG. 1). At block 207 (FIG. 2A), a test is performed to ascertain whether or not valid log-on information was received. If not, the process loops back to block 205. The affirmative branch from block 207 leads to block 209 where the instant messaging application 171 associates a viewer/listener identifier corresponding to the viewer/listener with a program identifier that uniquely identifies the audiovisual, video, or audio program being provided to the media presentation device 180 to thereby generate a program viewer/listener record associated with the viewer/listener and transmits the program viewer/listener record to the instant messaging application server 148.

At block 211, the instant messaging application server 148 transmits the program viewer/listener record to an electronic database, such as the program viewer database 147. A list of users who are viewing or listening to the program is acquired from the electronic database 147 by the instant messaging application server 148 (block 213). The process then proceeds to block 221 (FIG. 2C), to be described in greater detail hereinafter, or to optional block 215 (FIG. 2B). At block 215, the instant messaging application server 148 performs a test to ascertain whether or not any users on the acquired list of users are associated with a block parameter indicating that they do not wish to engage in instant messaging with the viewer/listener. If not, the instant messaging application server 148 may perform another test at optional block 217 to ascertain whether or not any users on the acquired list of users are associated with a block parameter indicating that they do not wish to engage in instant messaging at all. If not, the process advances to block 221 (FIG. 2C). The affirmative branch from optional block 215 (FIG. 2B), as well as the affirmative branch from optional block 217 leads to block 219 where the instant messaging application server 148 removes any user associated with a block parameter from the acquired list of users. The process then advances to block 221 (FIG. 2C).

At block 221, the list of users is transmitted to the media presentation device 180. Next, the process advances to block 227 (described in greater detail hereinafter) or to optional block 223. At optional block 223, one or more demographically-defined parameters are received for filtering the list of users so as to provide a demographically filtered list. For example, the list may be filtered by age, sex, geographic location, or any of a myriad of other demographic factors. The demographically filtered list is transmitted to the media presentation device 180 at optional block 225, and the process advances to block 227.

The viewer's or listener's selection of a user is accepted by the instant messaging application 171 from the list of users or from the demographically filtered list (block 227). An instant message is accepted by the instant messaging application 171 from the viewer or listener (block 229). The accepted message is sent to the selected user (block 231). Then, in optional block 233, an instant message is received from the selected user.

Figure 3:
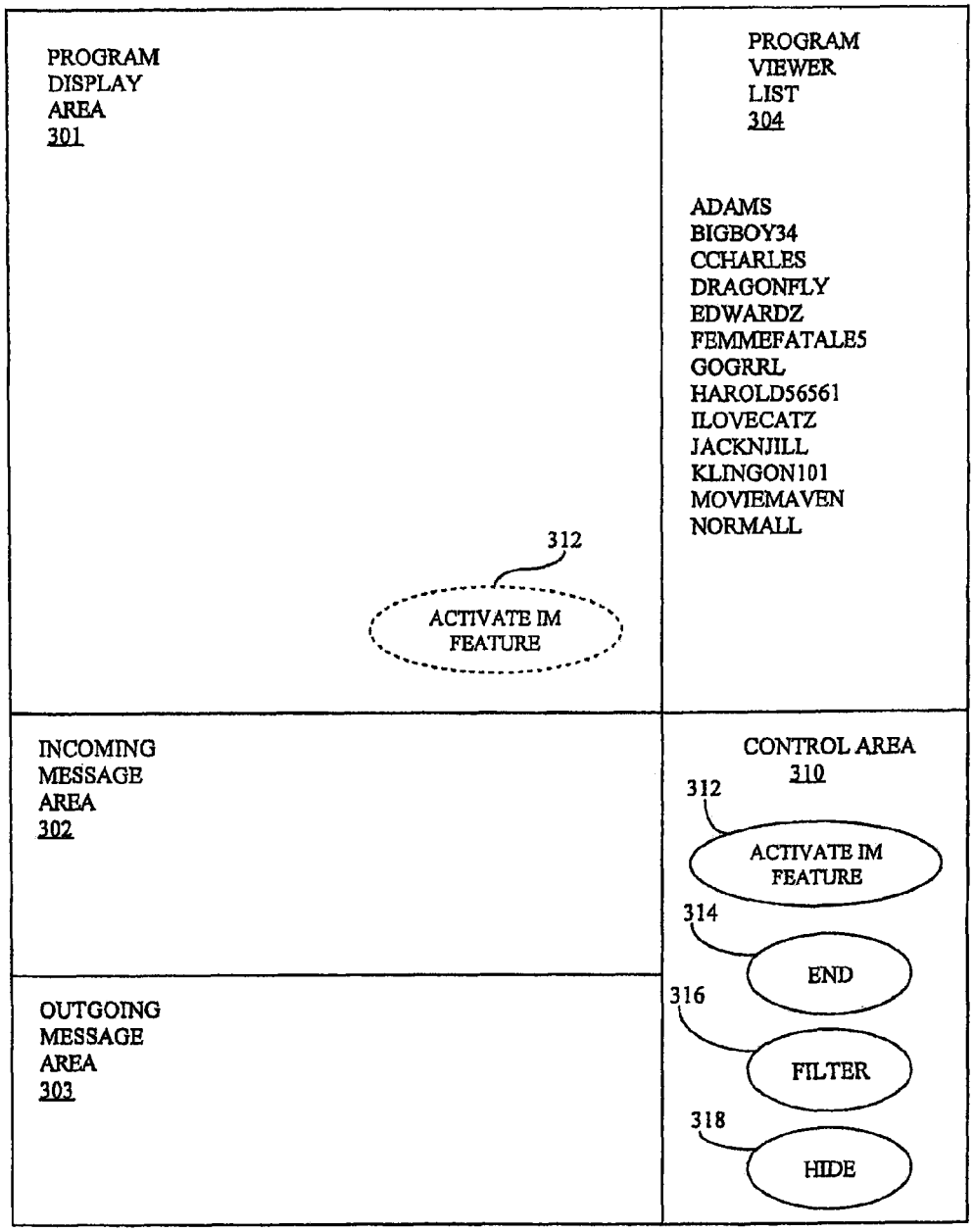
FIG. 3 shows an illustrative user interface for use with the process described in FIGS. 2A-2C.

FIG. 3 shows an illustrative user interface for use with the process described in FIGS. 2A-2C. The user interface may be displayed on media presentation device 180 (FIG. 1). Initially, media presentation device 180 may display a program display area 301 (FIG. 3) and an activate IM feature button 312 for activating instant messaging. Upon activating IM feature button 312, for example by using remote control 173 (FIG. 1), a viewer or listener may be presented with a log-on screen for a general log-on procedure, an instant messaging log-on procedure, or both. Upon the viewer or listener successfully logging on, media presentation device 180 may display program display area 301 (FIG. 3) along with a program viewer list 304, an incoming message area 302, an outgoing message area 303, and a control area 310.

Program viewer list 304 displays a list of viewers/listeners who are all viewing and/or listening to the same program on media presentation device 180 (FIG. 1). In the present example, these viewers/listeners include ADAMS, BIGBOY34, CCHARLES, DRAGONFLY and others. These names could, but need not, be user-selectable Instant Messaging screen names. In the case of an audiovisual or video program, or an audio program with visual images associated therewith, the program is displayed on program display area 301. If a viewer/listener wishes to send an instant message to a user, the viewer/listener clicks on a user name included in program viewer list 304, illustratively using remote control 173 (FIG. 1). The viewer/listener can then enter a desired text message into outgoing message area 303 (FIG. 3), illustratively using remote control 173 (FIG. 1) or another type of input mechanism. Incoming text messages from users are displayed in incoming message area 302.

Control area 310 may include a number of control buttons, such as an activate IM feature button 312, an end button 314, a filter button 316, and a hide button 318. The functionality of IM feature button 312 was described previously. End button 314 is employed to terminate an IM session, whereupon program viewer list 304, incoming message area 302 and outgoing message area 303, and control area 310 disappear, being replaced by program display area 301. Hide button 318 causes program viewer list 304, incoming message area 302, outgoing message area 303, and control area 310 to disappear, being replaced by program display area 301, either for a predetermined time interval or until activate IM feature button 312 is activated, so as to permit a full-screen display of important or desired segments of a program. Filter button 316 provides a mechanism by which one or more demographic filtering criteria may be applied to filter or sort through program viewer list 304.

The detailed description explains various exemplary embodiments, together with advantages and features, by way of example with reference to the drawings. As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of providing instant messaging in conjunction with a program, the method comprising:
    based on receiving a request from a requesting user to exchange messages with other users who consume the program, acquiring, by a server, a list of the other users who consume the program in addition to the requesting user;
    performing, by the server, a first test to ascertain whether any in the list of the other users has a first block parameter indicating not to engage in instant messaging at all;
    based on the server ascertaining that none in the list of the other users has the first block parameter not to engage in instant messaging at all, performing, by the server, a second test to ascertain whether any in the list of the other users has a second block parameter indicating not to engage in instant messaging with the requesting user;
    based on the server performing the first test and the second test, removing any in the list of the other users who has the first block parameter and the second block parameter before transmitting the list of the other users to the requesting user; and
    transmitting, by the server, the list of the other users to the requesting user in accordance with the first test and the second test in which any in the list of the other users having the first block parameter and the second block parameter were removed by the server prior to the list of the other users being transmitted to the requesting user.

2. The method of claim 1, further comprising receiving a selection of one of the other users from the list of the other users.

3. The method of claim 2, further comprising receiving an instant message from the requesting user.

4. The method of claim 3, further comprising transmitting the instant message to the one of the other users selected from the list of the other users.

5. The method of claim 1, further comprising providing the requesting user with a filter button in which to filter the list of the other users by demographically based criteria for filtering by age, gender, and geographic location.

6. The method of claim 1, further comprising associating a user identifier corresponding to the requesting user with a program identifier that uniquely identifies the program being provided to the user in order to generate a program record.

7. The method of claim 6, further comprising transmitting the program record to an electronic database.

8. An apparatus for providing instant messaging in conjunction with a program, the apparatus comprising:
    memory comprising computer-executable instructions; and
    a processor executing the computer-executable instructions, the computer-executable instructions, when executed by the processor, cause the processor to perform operations comprising:
    based on receiving a request from a requesting user to exchange messages with other users who consume the program, acquiring a list of the other users who consume the program in addition to the requesting user;
    performing a first test to ascertain whether any in the list of the other users has a first block parameter indicating not to engage in instant messaging at all;
    based on ascertaining that none in the list of the other users has the first block parameter not to engage in instant messaging at all, performing a second test to ascertain whether any in the list of the other users has a second block parameter indicating not to engage in instant messaging with the requesting user;
    based on performing the first test and the second test, removing any in the list of the other users who has the first block parameter and the second block parameter before transmitting the list of the other users to the requesting user; and
    transmitting the list of the other users to the requesting user in accordance with the first test and the second test in which any in the list of the other users having the first block parameter and the second block parameter were removed prior to the list of the other users being transmitted to the requesting user.

9. The apparatus of claim 8, further comprising receiving a selection of one of the other users from the list of the other users.

10. The apparatus of claim 9, further comprising receiving an instant message from the requesting user.

11. The apparatus of claim 10, further comprising transmitting the instant message to the one of the other users selected from the list of the other users.

12. The apparatus of claim 8, further comprising providing the requesting user with a filter button in which to filter the list of the other users by demographically based criteria for filtering by age, gender, and geographic location.

13. The apparatus of claim 8, further comprising associating a user identifier corresponding to the requesting user with a program identifier that uniquely identifies the program being provided to the user in order to generate a program record.

14. The apparatus of claim 13, further comprising transmitting the program record to an electronic database.

15. A computer program product, embodied on a non-transitory computer readable medium, for providing instant messaging in conjunction with a program, the computer program product including instructions that, when executed by a computer, cause the computer to perform operations comprising:
    based on receiving a request from a requesting user to exchange messages with other users who consume the program, acquiring a list of the other users who consume the program in addition to the requesting user;
    performing a first test to ascertain whether any in the list of the other users has a first block parameter indicating not to engage in instant messaging at all;
    based on ascertaining that none in the list of the other users has the first block parameter not to engage in instant messaging at all, performing a second test to ascertain whether any in the list of the other users has a second block parameter indicating not to engage in instant messaging with the requesting user;
    based on performing the first test and the second test, removing any in the list of the other users who has the first block parameter and the second block parameter before transmitting the list of the other users to the requesting user; and transmitting the list of the other users to the requesting user in accordance with the first test and the second test in which any in the list of the other users having the first block parameter and the second block parameter were removed prior to the list of the other users being transmitted to the requesting user.

16. The computer program product of claim 15, further comprising receiving a selection of one of the other users from the list of the other users.

17. The computer program product of claim 16, further comprising receiving an instant message from the requesting user.

18. The computer program product of claim 17, further comprising transmitting the instant message to the one of the other users selected from the list of the other users.

19. The computer program product of claim 15, further comprising providing the requesting user with a filter button in which to filter the list of the other users by demographically based criteria for filtering by age, gender, and geographic location.

20. The computer program product of claim 15, further comprising associating a user identifier corresponding to the requesting user with a program identifier that uniquely identifies the program being provided to the user in order to generate a program record.

* * * * *